United States Patent
Ziolko et al.

(10) Patent No.: US 9,361,589 B2
(45) Date of Patent: Jun. 7, 2016

(54) SYSTEM AND A METHOD FOR PROVIDING A DIALOG WITH A USER

(71) Applicant: AKADEMIA GORNICZO-HUTNICZA IM. STANISLAWA STASZICA W KRAKOWIE, Cracow (PL)

(72) Inventors: Bartosz Ziolko, Cracow (PL); Tomasz Pedzimaz, Cracow (PL)

(73) Assignee: AKADEMIA GORNICZO-HUTNICZA IM. STANISLAWA STASZIRA W. KRAKOWIE, Cracow (PL)

( * ) Notice: Subject to any disclaimer, the term of this patent is extended or adjusted under 35 U.S.C. 154(b) by 339 days.

(21) Appl. No.: 14/092,972

(22) Filed: Nov. 28, 2013

(65) Prior Publication Data

US 2015/0149391 A1 May 28, 2015

(51) Int. Cl.
| | | |
|---|---|---|
| *G06F 17/00* | (2006.01) | |
| *G06F 17/20* | (2006.01) | |
| *G06N 7/02* | (2006.01) | |
| *G06N 3/00* | (2006.01) | |

(Continued)

(52) U.S. Cl.
CPC .............. *G06N 7/02* (2013.01); *G06N 3/006* (2013.01); *G06N 5/02* (2013.01); *G10L 15/1822* (2013.01); *G10L 15/22* (2013.01); *G10L 13/00* (2013.01); *G10L 25/63* (2013.01); *G10L 2015/227* (2013.01)

(58) Field of Classification Search
USPC .......................................................... 706/11
See application file for complete search history.

(56) References Cited

U.S. PATENT DOCUMENTS

| | | | | |
|---|---|---|---|---|
| 2015/0146877 | A1* | 5/2015 | Palka | H04S 7/302 381/61 |
| 2015/0149391 | A1* | 5/2015 | Ziolko | G06N 7/02 706/11 |

OTHER PUBLICATIONS

Explicit Versus Implicit Graph Feature Maps: A Computational Phase Transition for Walk Kernels Kriege, N.; Neumann, M.; Kersting, K.; Mutzel, P. Data Mining (ICDM), 2014 IEEE International Conference on Year: 2014 pp. 881-886, DOI: 10.1109/ICDM.2014. 129 Referenced in: IEEE Conference Publications.*

(Continued)

*Primary Examiner* — Michael B Holmes
(74) *Attorney, Agent, or Firm* — Mark M. Friedman

(57) ABSTRACT

A computer-implemented method for providing a dialog with a user, the method comprising the steps of: (a) creating (501) dialog's plot scenario as a narrative graph structure containing the dialogs; (b) assigning (502) coefficients of dialog transitions maps to narrative graph nodes; (c) providing (503) speech input for recognition in a given context and dialog phase represented by current narrative graph node; (d) applying (504) algorithm for updating dialog coefficients based on user's speech or user's other behavior; (e) applying (505) at least one fuzzy logic algorithm which using user speech, and other coefficients on the transition map, determines transition to another narrative graph node (phase of a dialog or a plot), or updates a position on the transition map continuing the dialog in the same narrative graph node (f) determining (507) a response based on coefficients of the narrative graph; (g) repeating steps (c) to (f) for a particular narrative graph node until a transition is decided in step (e); (h) after a transition in step (e) repeating steps (c) to (f) with new coefficients in a new narrative graph node starting with a new position on a dialog graph structure and with new values of coefficients.

15 Claims, 5 Drawing Sheets

(51) Int. Cl.
    *G06N 5/02*     (2006.01)
    *G10L 15/18*     (2013.01)
    *G10L 15/22*     (2006.01)
    *G10L 25/63*     (2013.01)
    *G10L 13/00*     (2006.01)

(56) References Cited

OTHER PUBLICATIONS

Formal Verification and Synthesis for Discrete-Time Stochastic Systems Lahijanian, M.; Andersson, S.B.; Belta, C. Automatic Control, IEEE Transactions on Year: 2015, vol. 60, Issue: 8 pp. 2031-2045, DOI: 10.1109/TAC.2015.2398883 Referenced in: IEEE Journals & Magazines.*

Specification of Models Based on Contexts using Graph Grammars de Oliveira, M.A.; Ribeiro, L.; Mauro Duarte, L.; Cota, E. Theoretical Computer Science (WEIT), 2013 2nd Workshop-School on Year: 2013 pp. 129-134, DOI: 10.1109/WEIT.2013.36 Referenced in: IEEE Conference Publications.*

A Deeper Understanding of Sequence in Narrative Visualization Hullman, J.; Drucker, S.; Riche, N.H.; Bongshin Lee; Fisher, D.; Adar, E. Visualization and Computer Graphics, IEEE Transactions on Year: 2013, vol. 19, Issue: 12 pp. 2406-2415, DOI: 10.1109/TVCG.2013.119 Referenced in: IEEE Journals & Magazines.*

* cited by examiner

SYSTEM AND A METHOD FOR PROVIDING A DIALOG WITH A USER

BACKGROUND OF THE INVENTION

1. Field of the Invention

Embodiments of the invention generally relate to the field of computer-person dialog systems and methods and in particular to executing and managing such dialog in real time.

2. Description of the Related Art

Currently implemented dialog systems are old-fashioned. Dialogs in computer systems such as games are presently simulated by selection by a player of one of the specified keywords or sentences proposed in textual form, or one of the modes of emotional response.

There exists therefore a need for computer implemented dialog systems that would enable development of simulation games with a possibility of dialog in a form of speech, thus removing the restriction of having a dialog in the form of predefined phrases. Such a system would have a form of a control program for conducting dialogs and linking them to the plot of the game (or other situational context such as call centers, online shopping, online banking etc) created by a dialog designer.

A prior art publication EP 1061459 A2 entitled "System and method for automatically generating dynamic interfaces" discloses generating a customized method or algorithm for holding an interactive dialog session between a (human) user and a machine (hereinafter referred to simply as a "dialog"), such that the resulting dialog advantageously responds to the user's requests and wherein the system's capability (i.e., the dialog) is automatically modified thereafter based on dynamically changing external databases. Specifically, a computer system acts as a Dialog Generator agent by creating such a customized dialog consisting of services that are organized and presented in a form that is a combination of the user's expectations and the system's capabilities. In particular, the system's capabilities advantageously include the information content of database/service providers (such as, for example, a distributed information source such as the World Wide Web or a corporate file system), and the Dialog Generator advantageously modifies the dialog periodically in response to this dynamically changing external environment.

Another prior art publication EP 1927942 A1 entitled "Extending dialogue systems to process complex activities for applications" discloses a dialog system that includes a dialog manager to manage a conversation between the dialog system and a user, and to associate the conversation with a complex activity, and a plan engine to execute a plan script in connection with the complex activity, the plan script including a set of atomic dialog activities and logic to control a data and sequence flow of the atomic dialog activities, the set of atomic dialog activities being sub-activities of the complex activity, the complex activity being specified via a declarative activity specification language that connects the atomic dialog activities with a process.

The aim of the present invention is a system and computer implemented method for providing a dialog with a user that would be recognized by the user as more real-life experience of a dialog with a person than with a machine.

SUMMARY OF THE INVENTION

The object of the invention is a computer-implemented method for providing a dialog with a user, the method comprising the steps of: (a) creating dialog's plot scenario as a narrative graph structure containing the dialogs; (b) assigning coefficients of dialog transitions maps to narrative graph nodes; (c) providing speech input for recognition in a given context and dialog phase represented by current narrative graph node; (d) applying algorithm for updating dialog coefficients based on user's speech or user's other behavior; (e) applying at least one fuzzy logic algorithm which using user speech, and other coefficients on the transition map, determines transition to another narrative graph node (phase of a dialog or a plot), or updates a position on the transition map continuing the dialog in the same narrative graph node; (f) determining a response based on coefficients of the narrative graph; (g) repeating steps (c) to (f) for a particular narrative graph node until a transition is decided in step (e); (h) after a transition in step (e) repeating steps (c) to (f) with new coefficients in a new narrative graph node starting with a new position on a dialog graph structure and with new values of coefficients.

Preferably, the step of determining emotional state of the user is executed prior to the step of determining of a response.

Preferably, the emotional state is recognized based on user's speech parameters and/or gesture and pose recognition based on external sensors.

Preferably, the coefficients of dialog transitions maps are defined partly automatically based on natural language processing methods.

Preferably, the step of applying at least one fuzzy logic algorithm takes into account user's behavior.

Preferably, responses are created based on dictionary of words of a given language, a graph of semantic similarity of statements, and a set of rules for their use.

Preferably, for each graph node there is generated one map wherein the number of fields in the map depends on the number of possible exits from the given node.

Preferably, the decision about a transition is taken after a predetermined time.

Preferably, the decision about a transition is taken by a stop test.

Preferably, there is a default transition for a node if a transition map does not give a clear answer about the transition.

Preferably, there is a transition for a node if a transition map does not give a clear answer about the transition is taken randomly.

Preferably, the speech generation uses speech synthesis.

Preferably, the speech generation uses prerecorded speech.

Another object of the invention is a computer readable non-transitory storage medium storing computer-executable instructions performing all the steps of the computer-implemented method according to any of claims the invention when executed on a computer.

A further object of the invention is a computer-implemented system for providing a dialog with a user, the system comprising means for: (a) creating dialog's plot scenario as a narrative graph structure containing the dialogs; (b) assigning coefficients of dialog transitions maps to narrative graph nodes; (c) providing speech input for recognition in a given context and dialog phase represented by current narrative graph node; (d) applying algorithm for updating dialog coefficients based on user's speech or user's other behavior; (e) applying at least one fuzzy logic algorithm which using user speech, and other coefficients on the transition map, determines transition to another narrative graph node (phase of a dialog or a plot), or updates a position on the transition map continuing the dialog in the same narrative graph node; (f) determining a response based on coefficients of the narrative graph; (g) repeating steps (c) to (f) for a particular narrative graph node until a transition is decided in step (e); (h) after a transition in step (e) repeating steps (c) to (f) with new coefficients in a new narrative graph node starting with a new position on a dialog graph structure and with new values of coefficients.

BRIEF DESCRIPTION OF THE DRAWINGS

The object of the invention has been presented in an exemplary embodiment in a drawing, in which.

DETAILED DESCRIPTION OF THE PREFERRED EMBODIMENTS

Figure 1:
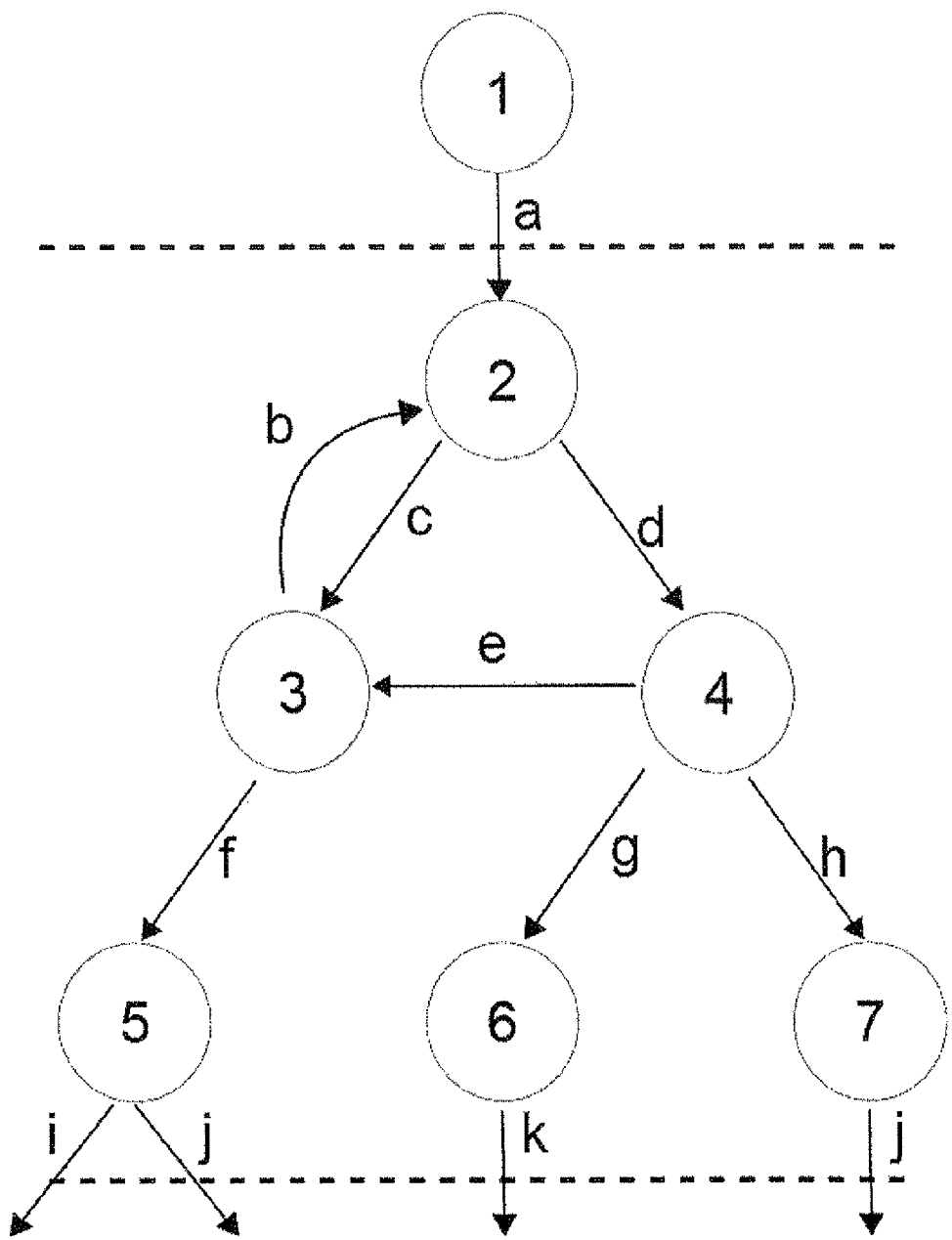
FIG. 1 presents an example of graph structure for a simple scenario of a fragment of a game.

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

The invention relates to managing a dialog and maintaining a script (be it a script of a call center, a game-play or the like) involving behaviors of a user (be it a client or a player). The user must observe his influence on the dialog but the system may not allow the dialog to become more and more remote from the main topic. In case of games there are of course possible numerous narrative paths.

There is required a dialog manager so that from a user's point of view, there is an impression that anything may be said and that the other side of the dialog will always react differently, based on the input expression.

In practice however, a graph of possible developments of the dialog shall be kept due to a requirement of maintaining the narrative path/topic, requirement of including predefined statements and adapting the dialog system to a database of predefined phrases and sentences.

A dialog's scenario is stored in a graph structure containing the dialogs and a narrative. The graph structure was chosen herein for its ease of storage of nonlinearity of scenario events. The current state of the scenario is reflected in a set of coefficients for the different narrative of events arranged at the nodes of the graph. Such coefficients are for example NPC attitude toward player, weather, daytime, previous conversations, properties of a player character.

A user, by carrying on conversations with a computer (for example game's non-playable characters (NPCs) based on both content and intonation of the speech, receives back information in dependence of the current narrative, affects behavior (including attitudes towards the user), and also changes the current state in the narrative.

Due to the need for integration of the present solution with a speech recognition module, which as a result of its data processing returns a probabilistic lattice of words as well as the need for achieving a non-linear scenario and uniqueness of a particular character behavior, it is necessary to use algorithms allowing to identify the current location in the scenario with a certain degree of freedom and imprecision.

An example of a speech recognition module, which as a result of its data processing returns a probabilistic lattice of words is 'Sarmata', 'HTK', 'Dragon'.

Additionally, the player/user in his speech can discuss the entire spectrum of topics not necessarily related to the current line of a dialog and events, and may be able to leave the current topic comments, reference previous events, as well as skip certain points of narrative, which will provide impression that the stories are nonlinear. The algorithm for statements analysis and determination of how they affect the current narrative are taken into account herein.

The use of fuzzy logic algorithms allows for mapping the impact of user's speech (received from speech analysis module in the form of a probabilistic lattice of words) on update of the coefficients of the narrative graph (for example the way in which the user's statement modifies the behavior of NPCs and their attitude towards the main character) and the choice of the transition from the current to another node of the same graph (the development of the dialog based on events).

The use of fuzzy logic algorithms can also reduce errors in the output analysis, which are inevitable in the absence of precision in both the input (lattice of words representing the user's speech contains various errors) as well as the current state of the narrative (the ability to model certainty of the event's occurrence, from non existing to probable until certain).

A condition for user's satisfaction with the dialog interaction is a skillful simulating of reaction of computer or NPCs and their response to the user's behavior by generating the appropriate paths of dialog for the computer side. There may be considered two possible variants:

Variant A: Due to the need of generating audio and text translations of computer games into many languages, most of the existing games have a predefined set of statements, which are played in a predefined moments of the narrative. In order to achieve the impression of lower linearity, and repeatability there are also prepared similar statements played alternately (for example, "hi", "hello", "good morning" used in greetings). This approach allows for the writers' full control of game's narrative.

Variant B: involves the implementation of a certain language model, along with its grammar, vocabulary terms for each topic of statements and rules of creation of longer utterances. This approach can generate less repetitive statements but cannot avoid some schematics in the generated responses on specific topics.

The present invention is a hybrid approach that combines the advantages of both methods. To a collection of prepared statements there are assigned attributes that describe their subject matter, the emotional attitude in which they can be used, moments in the narrative, in which they can be used, as well as a set of characters that can use the expression (the set may comprise only one character).

In addition, part of a NPC responses is created based on a dictionary of words of a given language, a graph of semantic similarity of statements, and a set of rules for their use (simplified grammar) allowing to create other versions of the given speech statement. In order to better imitate real speech statements for the generation of speech output there are also used N-grams. The aforementioned methods are presented in details in the citations of—D. Jurafsky, J. H. Martin, "Speech and Language Processing"; Pearson, Prentice Hall, 2009.

Figure 4:
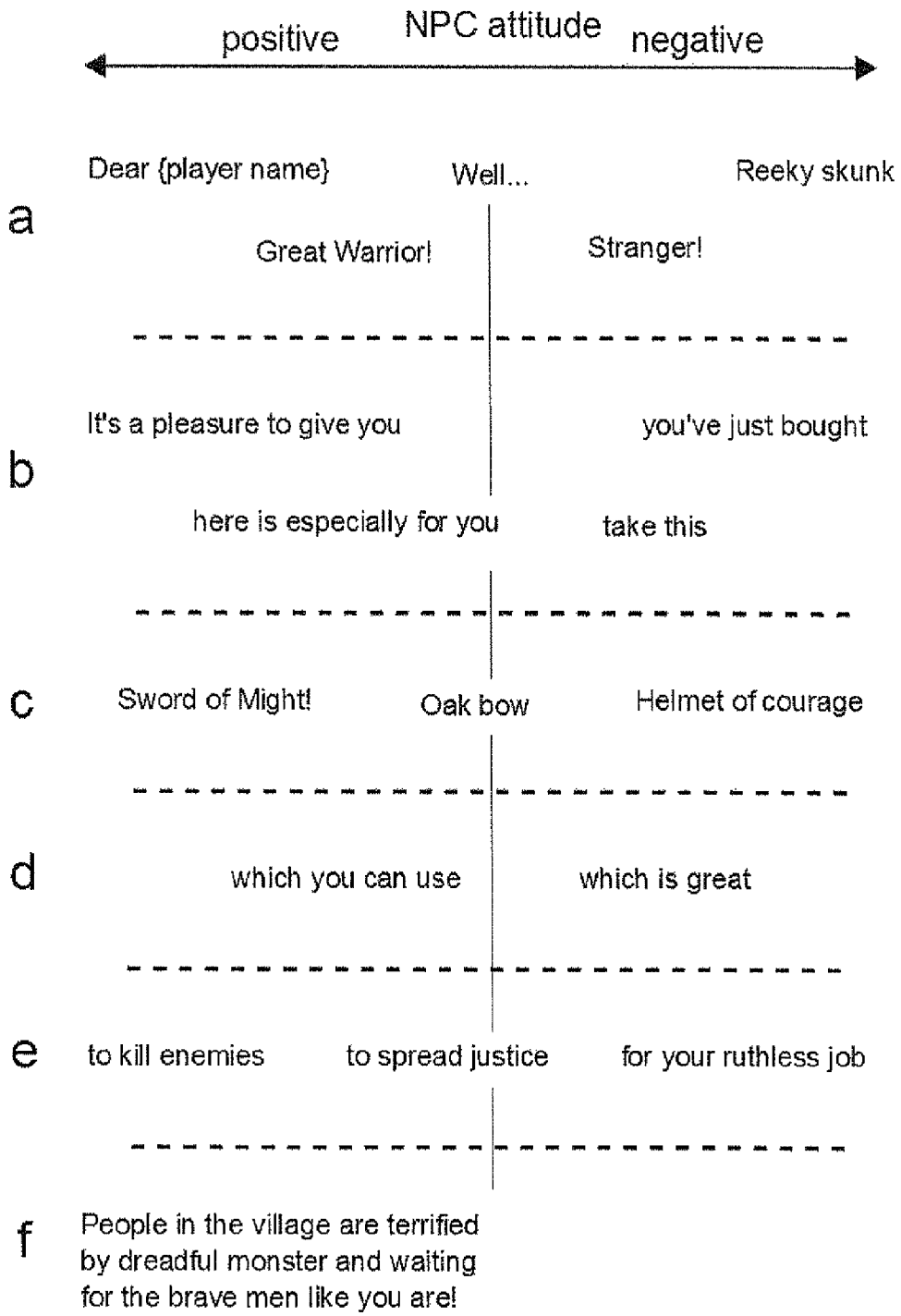
FIG. 4 presents examples of responses generation.

The possible topics of statements may include also questions unrelated to the narrative line (the question of time, location, weather, etc.). A potential speech response of the computer is generated based on the selected parameters' values (the current state of the graph of the narrative, the current state of NPC, the attitude of the computer character towards the user). As exemplified in FIG. 4, system response is generated based on NPC attitude (visible on left and right part of FIG. 4). A statement is prepared by selecting one by one fragment from each segment.

The game may also take into account the emotional state of the user and influence it. The first state is negotiation. Negotiation is a state, in which the user is encouraged to communicate, focus on solving a specific problem, finding an appropriate solution. The user focuses on the goal, is involved in maximizing the profits. The second state is persuasion. Persuasion is used for creating a situation in which the user will try to resolve a conflict. The third state is submission. Submission is a condition, in which the user will seek to comply without any objections in order to achieve the given benefits.

Such behaviors are an inseparable part of the context defined by the narrative. Detection and appropriate classification of the current emotional state of the user provides feedback to the system regarding the attitude of the user. Examples of such detection are keywords, emotion recognition based on player speech (high pitch, speaking faster, etc.) and/or gesture and pose recognition based on external sensors (e.g. Microsoft Kinect).

This allows to modify the narrative of the context (for example in a computer game or online shopping session), resulting in a more smooth and balanced dialog while increasing immersion of the user.

Each of the computer characters (such as NPCs) at a given time of narration is in a given attitude towards the user (e.g. a player). It is taken into account in the definition and selection of the subsequent line of a dialog. From the point of view of the algorithm for generation of a line of a dialog, this means a selection of texts from a specific, narrow pool of texts and words in dictionaries. Depending on the simulated emotional state of the computer character, there is also possible a change of the subject by the computer character, ignoring the user's statements and guidance of the user to a subject that is important for the narrative.

FIG. 1 presents an example of graph structure for a simple scenario of a fragment of a game. In this case, it is a dialog with an NPC, from which the player wants to buy an item (1). The conversation starts with a neutral attitude of the NPC towards the player (a). The statements of the player in the beginning of the conversation, such as greeting or a small talk (2) can make the NPC change its attitude to a negative attitude towards the player (c) or to a positive attitude (d) or remain neutral (d).

Both outputs make the dialog continue on with a different part of the paths of dialog—(3) in the case of a negative greeting, (4) in the case of a positive or neutral. From the state (3) one may by flattering return (b) to state (2), or to continue the conversation in a negative way (f) leading to a state of the dialog in which the NPC is the state of high irritation towards the player (5). Its at least partial decrease will lead to a finish of the conversation with the player (i), while further irritation will lead to an attack on the player (j).

In the case of the dialog system responsible for other than the negative reaction after the meeting (4) the player may start some dialog devoted to negotiating prices. Specifying too low price will make the seller angry (e) and enable option (3) of the dialog system. The player can also propose an average price (g) which will lead to the dialog system state (6) or a high price (h) which will lead to the dialog system state (7).

The dialog system state (6) can complete the purchase of the item (k), and the system state (7) the finalized the purchase and offer the player an exciting new job (j). The transition between different parts of the dialog is dependent on the use of different keywords (and their variants collected in a graph of similar concepts/terms) and the current narrative factors such as characteristics of the characters and their attitude with respect to the player, or the overall situation in the game.

The horizontal dotted lines indicate a separate narrative fragments after crossing the boundary of which, returning to the previous fragment is no longer possible. They are useful for the creation of the story, but are optional in the present invention. For example, the conduct of the described conversation negotiating price means that it will not be possible to restart the conversation in the same manner—the seller will remember the player and the result of the first conversation. Further reactions will depend on those past events.

In any case, it is possible that the player will not use specific keywords, which result in changes in the dialog system state, for example, in (4) the player may not begin the conversation about the price. In such a case, for some time the dialog system will maintain the conversation, and eventually move to another part of the dialog system randomly, or according to a predefined default path. In the case of (4) it may be (e), which leads to finalizing of the conversation without a purchase.

Figure 2:
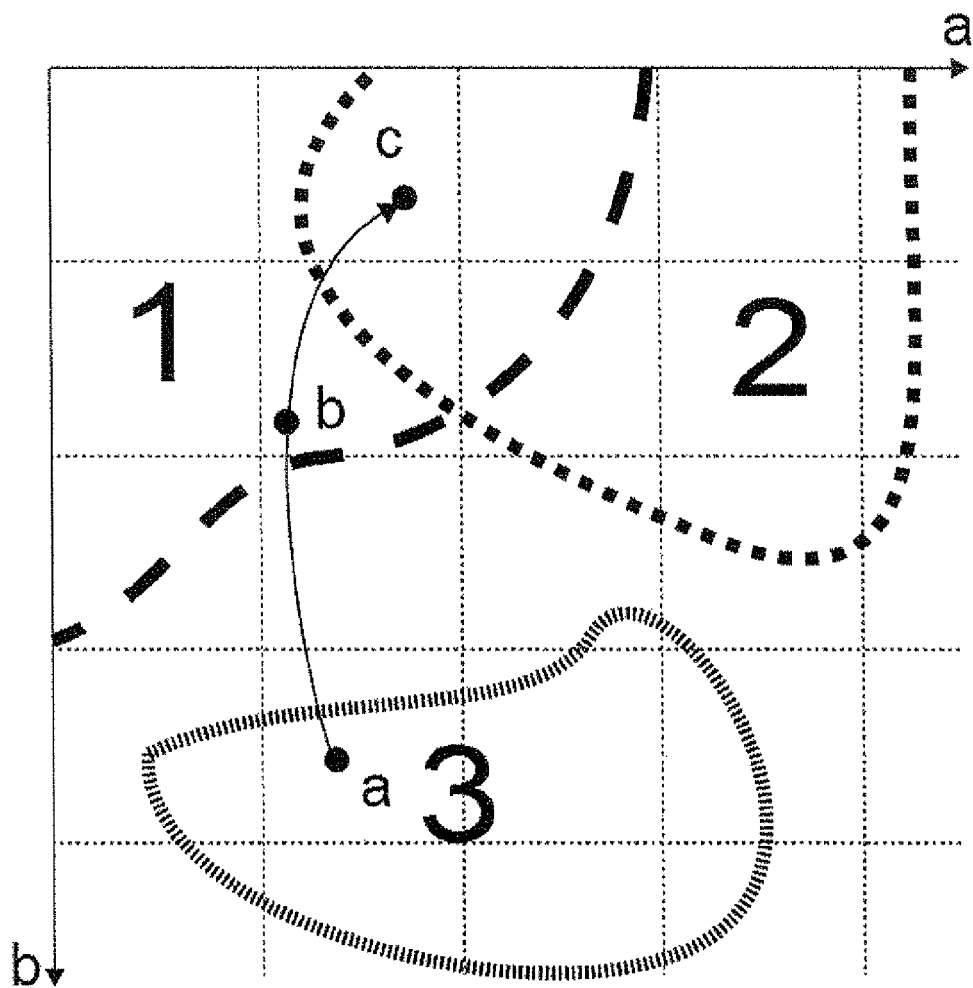
FIG. 2 schematically shows a multi-dimensional map of possible dialog transitions in a particular graph node from FIG. 1.

The decision regarding the transition between parts of the dialog is taken on the basis of multi-dimensional map of transitions schematically in FIG. 2.

FIG. 2 is simplified due to the multidimensionality of the issue (in real applications tens or hundreds of dimensions). Each dimension corresponds either to a specific group of words, which is a collection of similar concepts/terms, or other parameters influencing the course of the dialog, such as the characteristics of the player's character, the earlier events in the game, or even the weather, time of day, or the state of the game world. The marked fields 1, 2, 3 in FIG. 2 influence the outcome of the dialog section.

For each node (1) to (7) of FIG. 1, there is generated one map as shown in FIG. 2. The number of fields depends on the number of possible exits from the given node (the dialog system). Therefore, the example of FIG. 2 having three exits refers to the node (4) in FIG. 1. Field boundaries can be determined with a deterministic function or a probability according to the fuzzy logic (L. Zadeh, "Fuzzy sets," Information and Control, vol 8, pp. 338-353, 1965.) As a result, the fields may overlap. It is also possible that fragments of the dialog space are not covered by any of the fields.

After a brief exchange of sentences between the player and an NPC, there are counted characteristics, with specific weights, fulfilled in the fragment of the dialog. Elements that influence such weights are for example keywords, features of the narrative, weather, previous conversations with the same character and characteristic of the player character. The weights depend on a designed of the NPC.

The weights of words are taken directly from the lattice of speech recognition, therefore they are set with a certain probability. This follows directly from the imperfections of speech recognition systems. The assumption that the most likely hypothesis is correct and its use as characteristics often leads to a wrong decision.

A solution of better quality is the explicit entering of the probabilities of many hypotheses. Thanks to this there is set up a point in space determining dialog's run, modified with other factors. There are three situations possible: a point in space does not overlap any of the areas, overlaps one or more areas. If it does not overlap any, then a decision on changing the current node of the narrative may be taken according to the decision of the designer of the game; the conversation is continued in the current node (dialog system) or the node is exit via the default exit. If exactly one area overlaps with the selected point in the map then a transition is made via the exit corresponding to the area. If the point overlaps with several areas, a selection function is executed for selecting one exit based on a value of an affiliation function to specific areas at a given point.

The sets of words, that are dimensions of the map shown in FIG. 2 may be determined according to any of methods for words clustering. For example:
J. R. Bellegarda, "A latent semantic analysis framework for large-span language modeling," Proceedings of Eurospeech, vol. 3, pp. 1451-1454, 1997;
J. R. Bellegarda, "Latent semantic mapping," IEEE Signal Processing Magazine, vol. September, pp. 70-80, 70-80;
Y. Deng and S. Khudanpur, "Latent semantic information in maximum entropy language models for conversational speech recognition," Proceedings of the HLT-NAACL 03, pp. 56-63, 2003;
D. Jurafsky, J. H. Martin, "Speech and Language Processing"; Pearson, Prentice Hall, 2009
B. Ziółko, S. Manandhar, R. Wilson, "Bag-of-words Modelling for Speech Recognition", 2009 International Conference on Future Computer and Communication;
E. Agirre, E. Alfonseca, and O. L. de Lacalle, "Approximating hierarchy-based similarity for wordnet nominal synsets using topic signatures," Proceedings of the 2nd Global WordNet Conference. Brno, Czech Republic, 2004;
G. Gorrell and B. Webb, "Generalized Hebbian algorithm for incremental latent semantic analysis," proceedings of Intespeech, 2005.

It is important for the entire system to keep track of time of presence in a given node. This time should be determined by the creator of the narrative of the game, because it directly affects the group of people to whom the game is addressed. One may predefine a default value of 30 seconds, or specify an algorithm to decide based on how values change in the area's map using one of the well known optimization methods of stop test, described for example in—John E. Dennis and Robert B. Schnabel "Numerical Methods for Unconstrained Optimization and Nonlinear Equations", SIAM, 1983.

The exit from a node may be forced in order to achieve a sufficiently high value of one area on the map (high confidence that this is the appropriate response). The value can be incremented on a regular basis, and the conversation may be continued until there are relatively large changes on the dialog map. A node may end its operation and exit when the location of the point stabilizes.

One may also merge these methods, for example, by forcing a conversation for a certain time, after which the conversation is continued until a threshold value of one of the fields, but the threshold is decreasing over time.

Referring to FIG. 2 the line connecting points a, b and c is a line along which a point moves that determines where in different stages of a conversation the context is placed. It defines the topic of the conversation and adherence to previously described coefficients.

The above described structure has been shown for a specific dialog. In the same way it may be scaled up to larger game loops. In such case the nodes will be for example dialogs with individual NPCs, and the maps will describe the results of the individual dialogs, NPCs attitude towards the player after the conversations, the characteristics of a player and any other parameters that may affect the fate of the user's character created by the game designer.

The generation of a dialog line is executed with standard methods, known in the field, described for example in Jurafsky "Speech and Language Processing". Their execution is possible using speech synthesis or pre-recorded samples spoken by people.

Figure 3:
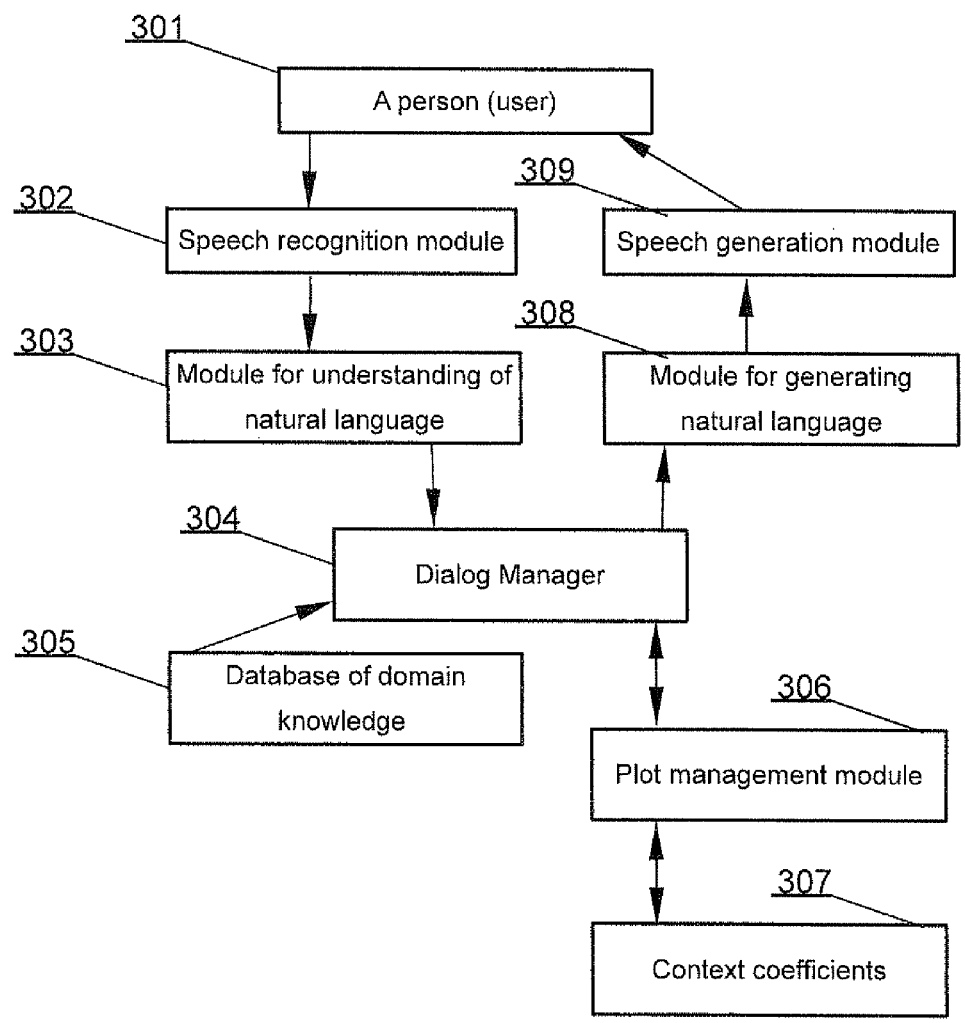
FIG. 3 presents a block diagram of a system according to the present invention.

FIG. 3 presents a block diagram of a system according to the present invention. The dialog system employing speech recognition interacts with a person or a plurality of persons 301. A person 301 inputs a question, or a statement in general, by speaking to a microphone. The sound registered by the microphone is processed by a speech recognition module 302 and subsequently hypotheses of its recognition are delivered to a module for understanding of natural language 303. After being processed in this module, sound data are passed to a dialog manager 304, which in cooperation with a plot management module 306 and plot context coefficients 307, by querying a database of domain knowledge 305, determines a response to a user's statement. After determining the response, a natural language response is generated at module for generating natural language 308 and subsequently speech generation module 309 (speech synthesis or playing prerecorded phrases). The generated response speech is output to the person 301 via a loudspeaker installed in the system.

Figure 5:
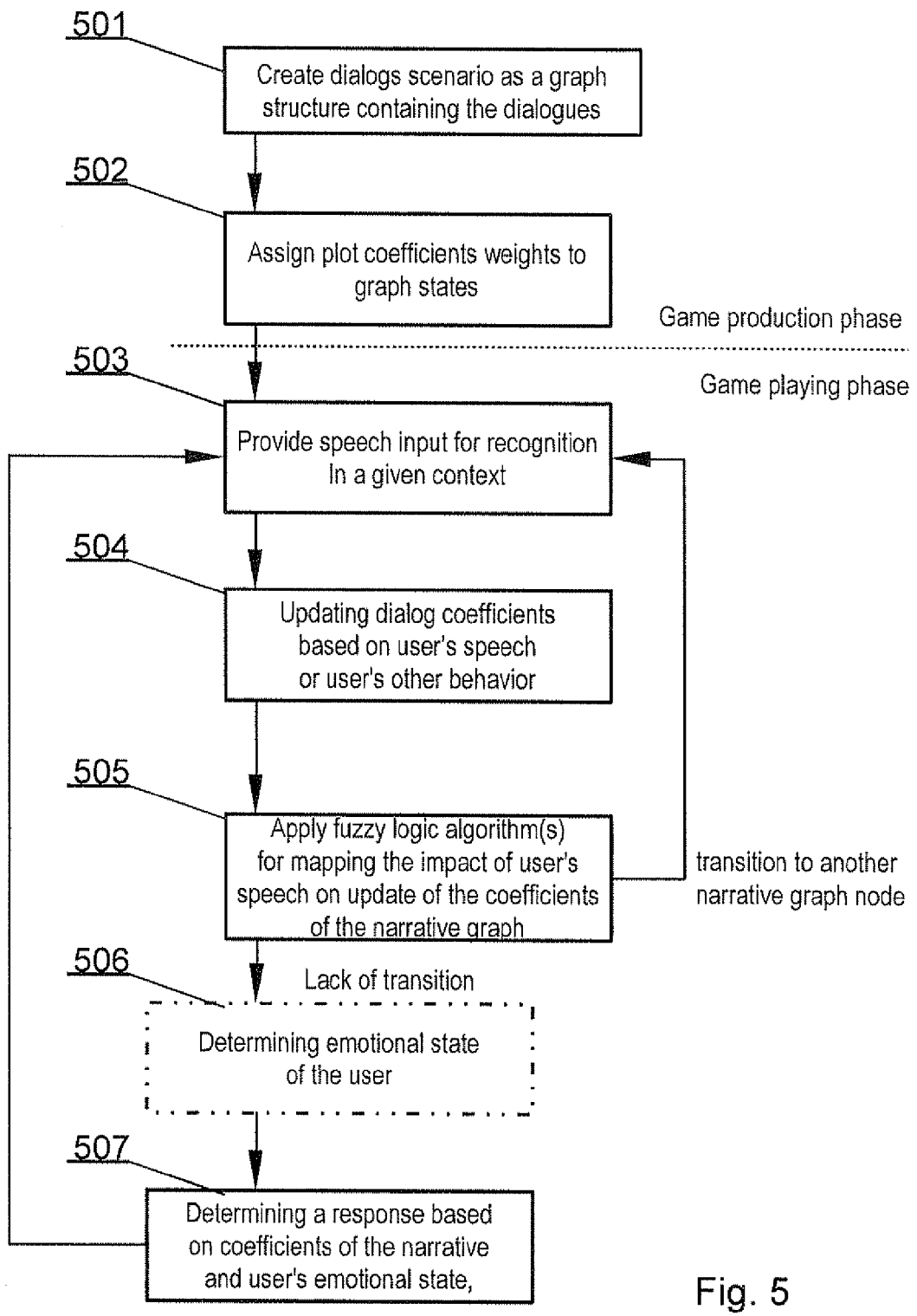
FIG. 5 presents the method according to the present invention.

As previously described, the method according to the present invention may be summarized as presented in FIG. 5. The process starts at step 501 from creating dialog's plot scenario as a narrative graph structure containing the dialogs. Next, at step 502, coefficients of dialog transitions maps are assigned to narrative graph nodes. Steps 501 and 502 are made during production of a game. The following steps are conducted while playing. Then, at step 503, there is provided speech input for recognition in a given context and dialog phase represented by the current narrative graph node. Further, at step 504, there is applied an algorithm for updating dialog coefficients based on user's speech or user's other behavior. Then, in step 505, at least one fuzzy logic algorithm is applied, which using user speech and other coefficients on the transition map, determines a transition to another narrative graph node (phase of a dialog or a plot) or updates a position on the transition map, continuing the dialog in the same narrative graph node. Next, at step 506, there is determined emotional state of the user and finally at step 507 there is executed determining of a response based on coefficients of the narrative and the user's emotional state. The steps 503-507 are repeated for a particular narrative graph node until a transition is decided in step 505. After transition in step 505, the steps 503-507 are repeated with new coefficients in a new narrative graph node, starting with a new position on a dialog graph structure and with new values of coefficients.

It can be easily recognized, by one skilled in the art, that the aforementioned computer implemented method for providing a dialog with a user may be performed and/or controlled by one or more computer programs. Such computer programs are typically executed by utilizing the computing resources in a computing device such as personal computers, personal digital assistants, cellular telephones, receivers and decoders of digital television or the like. Applications are stored on a non-transitory medium. An example of a non-transitory medium is a non-volatile memory, for example a flash memory or volatile memory, for example RAM. The computer instructions and are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A computer-implemented method for providing a dialog with a user, the method comprising the steps of:
   (a) creating (501) dialog's plot scenario as a narrative graph structure containing the dialogs;
   (b) assigning (502) coefficients of dialog transitions maps to narrative graph nodes;
   (c) providing (503) speech input for recognition in a given context and dialog phase represented by current narrative graph node;
   (d) applying (504) algorithm for updating dialog coefficients based on user's speech or user's other behavior;
   (e) applying (505) at least one fuzzy logic algorithm which using user speech, and other coefficients on the transition map, determines transition to another narrative graph node (phase of a dialog or a plot), or updates a position on the transition map continuing the dialog in the same narrative graph node;
   (f) determining (507) a response based on coefficients of the narrative graph;
   (g) repeating steps (c) to (f) for a particular narrative graph node until a transition is decided in step (e);
   (h) after a transition in step (e) repeating steps (c) to (f) with new coefficients in a new narrative graph node starting with a new position on a dialog graph structure and with new values of coefficients.

2. The method according to claim 1 wherein the step of determining (506) emotional state of the user is executed prior to the step of determining of a response (507).

3. The method according to claim 2 wherein the emotional state is recognized based on user's speech parameters and/or gesture and pose recognition based on external sensors.

4. The method according to claim 1 wherein the coefficients of dialog transitions maps are defined partly automatically based on natural language processing methods.

5. The method according to claim 1 wherein the step of applying (505) at least one fuzzy logic algorithm takes into account user's behavior.

6. The method according to claim 1 wherein responses are created based on dictionary of words of a given language, a graph of semantic similarity of statements, and a set of rules for their use.

7. The method according to claim 1 wherein for each graph node there is generated one map wherein the number of fields in the map depends on the number of possible exits from the given node.

8. The method according to claim 1 wherein the decision about a transition is taken after a predetermined time.

9. The method according to claim 1 wherein the decision about a transition is taken by a stop test.

10. The method according to claim 8 wherein there is a default transition for a node if a transition map does not give a clear answer about the transition.

11. The method according to claim 8 wherein there is a transition for a node if a transition map does not give a clear answer about the transition is taken randomly.

12. The method according to claim 6 where speech generation module (309) uses speech synthesis.

13. The method according to claim 6 where speech generation module (309) uses prerecorded speech.

14. A computer readable non-transitory storage medium storing computer-executable instructions performing all the steps of the computer-implemented method according to claim 1 when executed on a computer.

15. A computer-implemented system for providing a dialog with a user, the system comprising means for:
   (a) creating (501) dialog's plot scenario as a narrative graph structure containing the dialogs;
   (b) assigning (502) coefficients of dialog transitions maps to narrative graph nodes;
   (c) providing (503) speech input for recognition in a given context and dialog phase represented by current narrative graph node;
   (d) applying (504) algorithm for updating dialog coefficients based on user's speech or user's other behavior;
   (e) applying (505) at least one fuzzy logic algorithm which using user speech, and other coefficients on the transition map, determines transition to another narrative graph node (phase of a dialog or a plot), or updates a position on the transition map continuing the dialog in the same narrative graph node;
   (f) determining (507) a response based on coefficients of the narrative graph;
   (g) repeating steps (c) to (f) for a particular narrative graph node until a transition is decided in step (e);
   (h) after a transition in step (e) repeating steps (c) to (f) with new coefficients in a new narrative graph node starting with a new position on a dialog graph structure and with new values of coefficients.

* * * * *

UNITED STATES PATENT AND TRADEMARK OFFICE
CERTIFICATE OF CORRECTION

PATENT NO. : 9,361,589 B2  
APPLICATION NO. : 14/092972  
DATED : June 7, 2016  
INVENTOR(S) : Bartosz Ziolko et al.

Page 1 of 1

It is certified that error appears in the above-identified patent and that said Letters Patent is hereby corrected as shown below:

Title page, item 73 should be corrected as follows:

Change:

-- AKADEMIA GORNICZO-HUTNICZA IM. STANISLAWA STASZIRA W KRAKOWIE -- to

"AKADEMIA GORNICZO-HUTNICZA IM. STANISLAWA STASZICA W KRAKOWIE"

Signed and Sealed this  
Twenty-third Day of August, 2016

Michelle K. Lee  
*Director of the United States Patent and Trademark Office*